(12) United States Patent
Barti et al.

(10) Patent No.: US 11,569,710 B2
(45) Date of Patent: Jan. 31, 2023

(54) ROTOR SHAFT FOR AN ELECTRIC MACHINE AND ELECTRIC MACHINE

(71) Applicant: Bayerische Motoren Werke Aktiengesellschaft, Munich (DE)

(72) Inventors: Endre Barti, Munich (DE); Julian Blum, Munich (DE); Markus Lang, Munich (DE); Daniel Loos, Munich (DE); Holger Ulbrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 293 days.

(21) Appl. No.: 16/539,168

(22) Filed: Aug. 13, 2019

(65) Prior Publication Data

US 2019/0363609 A1 Nov. 28, 2019

Related U.S. Application Data

(63) Continuation of application No. PCT/EP2018/052689, filed on Feb. 2, 2018.

(30) Foreign Application Priority Data

Feb. 14, 2017 (DE) ...................... 10 2017 202 356.2

(51) Int. Cl.
*H02K 7/00* (2006.01)
*H02K 9/19* (2006.01)
*H02K 5/20* (2006.01)

(52) U.S. Cl.
CPC ............. *H02K 7/003* (2013.01); *H02K 5/207* (2021.01); *H02K 9/19* (2013.01)

(58) Field of Classification Search
CPC ............ H02K 9/19; H02K 9/06; H02K 3/487; H02K 3/24; H02K 5/20; H02K 5/02;
(Continued)

(56) References Cited

U.S. PATENT DOCUMENTS 3,562,569 A * 2/1971 Koechlin ................. H02K 3/32
310/214
3,979,821 A * 9/1976 Noodleman ......... H02K 13/006
29/598
(Continued)

FOREIGN PATENT DOCUMENTS

CN 1515061 A 7/2004
CN 262042964 U 11/2011
(Continued)

OTHER PUBLICATIONS

Chinese Office Action issued in Chinese application No. 201880805400.6 dated Jul. 28, 2020 (Nine (9) pages).
(Continued)

*Primary Examiner* — Bryan R Perez
(74) *Attorney, Agent, or Firm* — Crowell & Moring LLP

(57) ABSTRACT

A rotor shaft for an electric machine includes a rotor shaft main body and a rotor shaft core which is arranged therein and which is connected to the rotor shaft main body. The rotor shaft comprises a substantially axially running cooling cavity configured to conduct a cooling fluid, and the rotor shaft core is composed of a different material than the rotor shaft main body.

16 Claims, 2 Drawing Sheets

(58) Field of Classification Search
CPC ............ H02K 15/02; H02K 1/20; H02K 1/32; H02K 2209/00; H02K 7/003
See application file for complete search history.

(56) References Cited

U.S. PATENT DOCUMENTS

| | | | |
|---|---|---|---|
| 4,171,494 A | 10/1979 | Yamaguchi et al. | |
| 5,523,635 A | 6/1996 | Ferreira et al. | |
| 6,379,117 B1* | 4/2002 | Ichiryu | F01D 5/081 |
| | | | 416/96 R |
| 2003/0098627 A1* | 5/2003 | Mitchell | H02K 7/003 |
| | | | 310/156.08 |
| 2003/0132673 A1 | 7/2003 | Zhou et al. | |
| 2007/0228847 A1 | 10/2007 | Kim | |
| 2009/0214348 A1* | 8/2009 | Buccheri | F04D 19/042 |
| | | | 416/204 A |
| 2010/0117473 A1 | 5/2010 | Masoudipour et al. | |
| 2012/0299404 A1* | 11/2012 | Yamamoto | H02K 1/32 |
| | | | 310/61 |
| 2015/0042185 A1* | 2/2015 | Buttner | H02K 1/32 |
| | | | 310/54 |
| 2015/0280523 A1 | 10/2015 | Tremelling et al. | |

FOREIGN PATENT DOCUMENTS

| | | |
|---|---|---|
| CN | 104285361 A | 1/2015 |
| CN | 105531911 A | 4/2016 |
| CN | 105619638 A | 6/2016 |
| EP | 1 892 512 A2 | 2/2008 |
| EP | 2 846 440 A1 | 3/2015 |
| FR | 3 004 601 A1 | 10/2014 |
| WO | WO 2015/036376 A2 | 3/2015 |

OTHER PUBLICATIONS

PCT/EP2018/052689, International Search Report dated Apr. 25, 2018 (Three (3) pages).
German Search Report issued in German counterpart application No. 10 2017 202 356.2 dated Mar. 1, 2019, with Statement of Relevancy (Eight (8) pages).

\* cited by examiner

ROTOR SHAFT FOR AN ELECTRIC MACHINE AND ELECTRIC MACHINE

CROSS REFERENCE TO RELATED APPLICATIONS

This application is a continuation of PCT International Application No. PCT/EP2018/052689, filed Feb. 2, 2018, which claims priority under 35 U.S.C. § 119 from German Patent Application No. 10 2017 202 356.2, filed Feb. 14, 2017, the entire disclosures of which are herein expressly incorporated by reference.

BACKGROUND AND SUMMARY OF THE INVENTION

The invention relates to a rotor shaft for an electric machine, and to an electric machine.

Rotor shafts for electric machines are, in the prior art, commonly equipped with a so-called hollow-shaft cooling arrangement. Here, the shaft is equipped with an axial bore into which a cooling fluid, for example water, is introduced.

The cooling fluid may be introduced into the axial bore by means of a so-called cooling fluid lance. Here, the axial bore may be a blind bore. The cooling fluid then emerges again on the same side of the shaft at which it is introduced through the cooling fluid lance.

It is additionally known from the prior art that a cooling fluid present in an axial bore generates friction losses during the rotation of the rotor shaft. Therefore, in the case of rotor shafts which rotate at high rotational speeds, the axial bore for the cooling fluid is designed with a relatively small diameter. Friction losses generated by the cooling fluid can thus be reduced.

In order to realize a good cooling action by means of the cooling fluid, known rotor shafts are generally produced from a solid material. Good thermal conductivity between the cooling fluid and a shell surface of the rotor shaft is then ensured. The formation of cavities for weight reduction purposes is in this case associated with a considerable impairment of said thermal conductivity, such that, in many cases, this is dispensed with.

It is an object of the present invention to further improve known rotor shafts. In particular, it is sought to provide rotor shafts which can be cooled in an efficient and effective manner and which at the same time have a low weight and therefore a low inertia.

This object may be achieved by means of a rotor shaft for an electric machine, having a rotor shaft main body and having a rotor shaft core which is arranged therein and which is connected to the rotor shaft main body, wherein the rotor shaft comprises a substantially axially running cooling cavity for conducting a cooling fluid, and the rotor shaft core is composed of a different material than the rotor shaft main body.

The cooling fluid is for example water.

The cooling cavity may be open axially on one side. It is then possible in a known manner for a cooling fluid lance to be introduced such that an adequate cooling action can be realized. The cooling cavity may also be designed to be open axially on both sides. The cooling fluid can then be conducted axially through the rotor shaft.

The rotor shaft core is preferably produced from a material which has a lower density than the material from which the rotor shaft main body is produced.

It is furthermore preferable for the thermal conductivities of the two materials to be of similar magnitude.

Alternatively, the thermal conductivity of the material of the rotor shaft core may be greater than that of the rotor shaft main body. Such a shaft is therefore lighter in relation to known shafts. At the same time, good heat conduction between the shell surface of the rotor shaft and the cooling cavity is ensured. By means of the reduced weight, the inertia of the rotor shaft is also reduced. In this way, dynamic mobility of the rotor is made possible. The stator defects and advantages apply in particular for rotor shafts with a relatively large outer diameter, which are designed for fast rotation, because, in the case of such rotor shafts, the heat conduction path between the shell surface of the rotor shaft and the cooling cavity is relatively long. It is accordingly also possible for a large amount of weight to be saved. By means of the respective proportions of the rotor shaft main body and of the rotor shaft core and by means of the materials used for these two components, it is furthermore possible for the mechanical characteristics of the rotor shaft, for example with regard to bending, torsion or thermal expansion, to be set in an exact manner.

In one embodiment, a cooling fluid lance and preferably a cooling fluid diverting piece are arranged in the cooling cavity. The cooling fluid is introduced in a known manner into the rotor shaft from one axial side through the cooling fluid lance. The fluid diverting piece then ensures that the cooling fluid emerges from the rotor shaft again on the same side. For such a shaft, the connection to a cooling fluid line system takes up only a small amount of structural space. At the same time, the cooling cavity can be produced with little effort, for example by means of a blind bore. The cooling fluid diverting piece is then the base of the blind bore.

The rotor shaft core may be produced from an aluminum material, a magnesium material and/or a plastic, and the rotor shaft main body may be produced preferably from a steel material. Here, by means of the steel material, the rotor shaft is provided with adequate mechanical strength and stiffness. Since aluminum and magnesium have a considerably lower density than steel, weight can be saved through the use of such a rotor core. This also applies to the use of a plastic, which generally likewise has a lower density than steel. At the same time, aluminum and magnesium exhibit considerably higher thermal conductivity than steel, whereby the heat conduction from the shell of the rotor shaft to the cooling cavity is considerably improved. In this way, the cooling capability of the rotor shaft is also facilitated. It is furthermore conceivable for the rotor shaft core to be produced from a combination of the stated materials.

The cooling cavity preferably runs substantially centrally and in continuous fashion in the rotor shaft. Here, "in continuous fashion" means that the cooling cavity runs from one axial rotor shaft end to the other axial rotor shaft end. Uniform cooling of the rotor shaft is thus ensured both from a radial aspect and from an axial aspect. Stresses resulting from thermal expansion are thus prevented in an effective manner, resulting in reliable functioning and a long service life of the rotor shaft.

The cooling cavity may run partially in the rotor shaft main body and partially in the rotor shaft core. A high level of design freedom for the mechanical and thermal configuration of the rotor shaft is thus provided. The rotor shaft is thus easily and reliably adapted to the given usage conditions.

In one variant, the rotor shaft core is spaced apart axially from a first and/or a second rotor shaft end. The two rotor shaft ends are thus formed as constituent parts of the rotor shaft main body. High mechanical stability of the rotor shaft ends is thus ensured, which are commonly formed as bearing points or the like.

In one embodiment, the rotor shaft core is introduced by means of a casting process into the rotor shaft main body. After the space provided for the rotor shaft core has been created in the rotor shaft main body, the rotor shaft core is thus introduced in liquid form into said space. The rotor shaft core then solidifies in the interior of the rotor shaft main body. Mechanical reworking, for example by cutting, may follow. In particular, the cooling cavity may be formed in retroactively by cutting machining. The rotor shaft is thus produced easily and inexpensively. At the same time, particularly good thermal contacting between the rotor shaft core and the rotor shaft main body is ensured in this way.

In an alternative embodiment, the rotor shaft core is introduced as a solid body into the rotor shaft main body. For example, for this purpose, the rotor shaft core is inserted into the rotor shaft main body. The cooling cavity or at least a part thereof may in this case have already been prefabricated in the rotor shaft main body and/or in the rotor shaft core.

The rotor shaft main body may be in two parts, wherein the second rotor shaft main body parts are connected to one another preferably after the introduction of the rotor shaft core and in particular by welding. Such a rotor shaft main body is advantageous in particular in conjunction with a rotor shaft core which is introduced as a solid body into the rotor shaft main body. For example, the rotor shaft main body comprises a rotor shaft primary body and a rotor shaft end piece which is connected to the rotor shaft primary body after the installation of the rotor shaft core. Simple assembly of the rotor shaft is thus realized.

In one embodiment, the rotor shaft comprises at least one axially continuous air channel. In particular, the air channel runs parallel to a rotor shaft axis. By means of the air channel, the weight and the inertia of the rotor shaft are further reduced. Furthermore, in this way, additional air cooling of the rotor shaft is made possible. In relation to known rotor shafts, in particular in relation to rotor shafts with cavities which are however formed without a rotor shaft core, improved thermal conductivity between the shell of the rotor shaft and the cooling cavity is realized.

The air channel may be produced for example by drilling and/or erosion. The production thereof is thus simple and inexpensive. In the case of production by erosion, it is furthermore possible for any desired, even varying, cross-sectional form to be selected.

In one variant, the air channel encloses an acute angle with a rotor shaft axis. The air channel is thus inclined relative to the axis of rotation of the rotor shaft. When the rotor shaft rotates, the inertia of the air then results in a suction effect which causes ambient air to be drawn through the air channel. If multiple air channels are formed in the rotor shaft, these may be arranged with the same or different acute angles.

The air channel may run partially in the rotor shaft main body and partially in the rotor shaft core. This yields a high level of design freedom for the rotor shaft with regard to the air channel.

Furthermore, the rotor shaft may comprise multiple, preferably between four and ten, air channels, and the air channels may be circumferentially uniformly distributed and arranged in each case with an identical radial spacing around the cooling cavity. In the case of such a rotor shaft, effective air cooling is realized in addition to the cooling via the cooling cavity. Furthermore, the air cooling is uniform from a radial and axial aspect. Furthermore, such a rotor shaft is balanced from an axial and radial aspect, such that no imbalances arise.

Furthermore, the object is achieved by means of an electric machine having a rotor shaft according to the invention. An electric machine of said type is preferably an electric motor, for example a permanently excited synchronous machine (PSM) or an asynchronous machine (ASM). Such electric machines exhibit particularly high performance owing to the improved cooling. The low weight of the rotor shaft means that the electric machine can be activated and moved with very high dynamics.

The invention will be discussed below on the basis of various exemplary embodiments which are shown in the appended drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
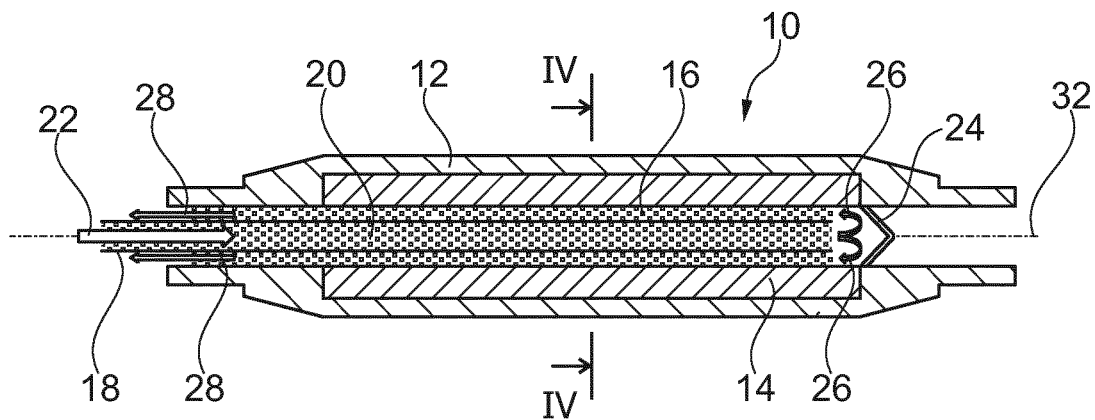
FIG. 1 schematically shows a rotor shaft according to the invention of an electric machine according to the invention according to a first embodiment.

FIG. 1 shows a rotor shaft 10 for an electric machine (not illustrated in any more detail), wherein the rotor shaft 10 comprises a rotor shaft main body 12 and a rotor shaft core 14 which is arranged in the rotor shaft main body 12 and which is connected to the rotor shaft main body 12.

Furthermore, a cooling cavity 16 is arranged in the rotor shaft 10, which cooling cavity is a central, substantially axial bore in the embodiment illustrated.

A cooling fluid lance 18 is inserted into the cooling cavity 16, via which cooling fluid lance a cooling fluid 20 is introduced into the cooling cavity 16. Here, the introduction direction is illustrated by an arrow 22.

The cooling cavity 16 runs basically continuously in the rotor shaft 10, but is delimited at the end averted from the cooling fluid lance 18 by a cooling fluid diverting piece 24. Said cooling fluid diverting piece diverts the cooling fluid 20, as symbolized by the arrows 26, such that said cooling fluid emerges from the cooling cavity 16 again on the same side of the rotor shaft 10 at which it was introduced into the cooling cavity 16 (see arrow 22). The emergence is symbolized by the arrows 28.

The result is thus a continuous flow of the cooling fluid 20 through the cooling cavity 16.

Viewing the cooling cavity 16 from the side at which the cooling fluid 20 enters it, the cooling cavity 16 runs firstly in the rotor shaft main body 12 and then in the rotor shaft core 14.

Here, the rotor shaft core 14 is spaced apart from a first and/or a second rotor shaft end. Said rotor shaft core is thus situated centrally in the rotor shaft 10 in an axial direction too.

The rotor shaft core 14 is produced from a different material than the rotor shaft main body 12. For example, the rotor shaft core 14 is composed of an aluminum material and the rotor shaft main body 12 is composed of a steel material.

Here, the production of the rotor shaft 10 is performed as follows: firstly, the rotor shaft main body 12 is manufactured. The rotor shaft core 14 is subsequently cast in liquid form into the space provided for it in the rotor shaft main body 12. Subsequently, that is to say after the rotor shaft 14 has solidified, the cooling cavity 16 is produced by cutting machining.

Figure 2:
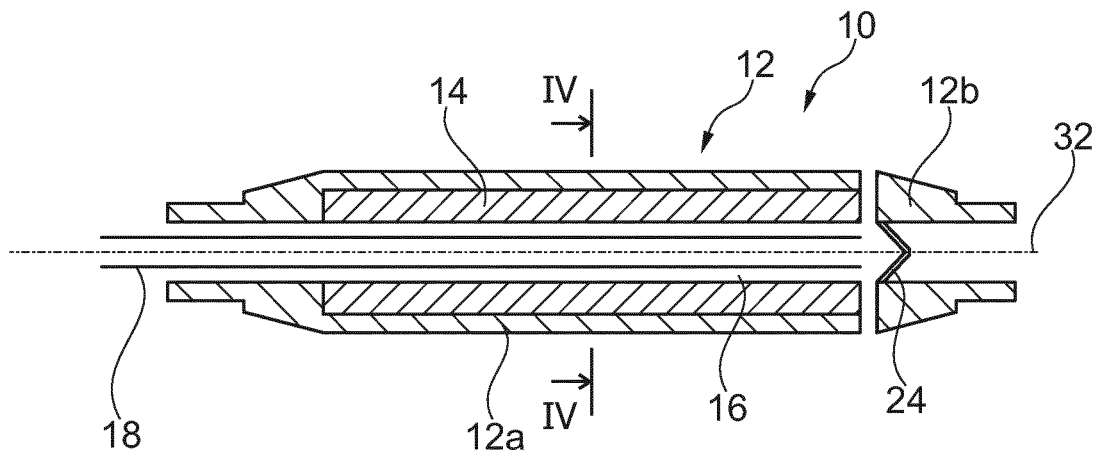
FIG. 2 schematically shows a rotor shaft according to the invention of an electric machine according to the invention according to a second embodiment.

The second embodiment, illustrated in FIG. 2, of the rotor shaft 10 differs from the embodiment as per FIG. 1 by the fact that the rotor shaft main body 12 is formed in two parts.

In this embodiment, to produce the rotor shaft, firstly the two rotor shaft main body parts 12a and 12b are produced, wherein, in the embodiment illustrated, the rotor shaft main body part 12a is formed as a rotor shaft primary body and the rotor shaft main body part 12b is formed as a rotor shaft end piece.

In this embodiment, the rotor shaft core 14 is positioned as a solid body in the space provided in the rotor shaft main body part 12a. Then, the two rotor shaft main body parts 12a and 12b are connected to one another, for example by welding.

The other features of the rotor shaft 10 from FIG. 2 correspond to those from FIG. 1, to which reference is made at this juncture.

Figure 3:
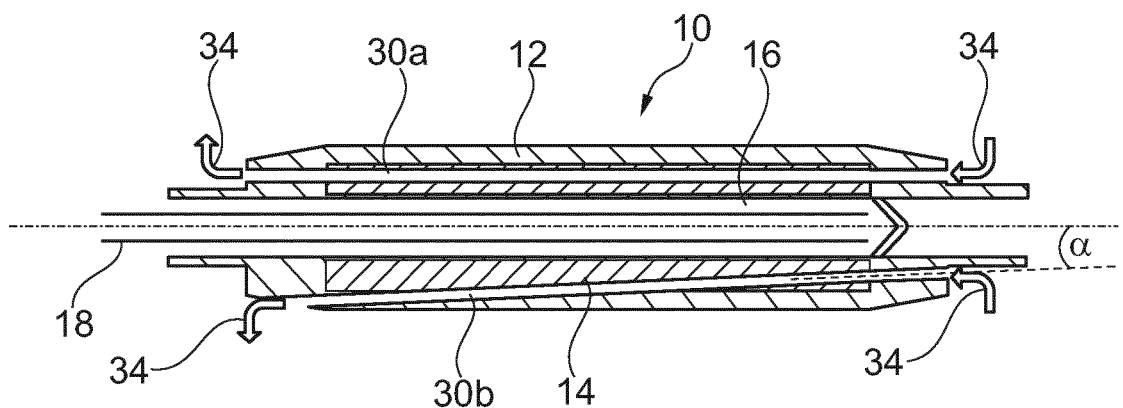
FIG. 3 schematically shows a rotor shaft according to the invention of an electric machine according to the invention according to a third embodiment.
Figure 4:
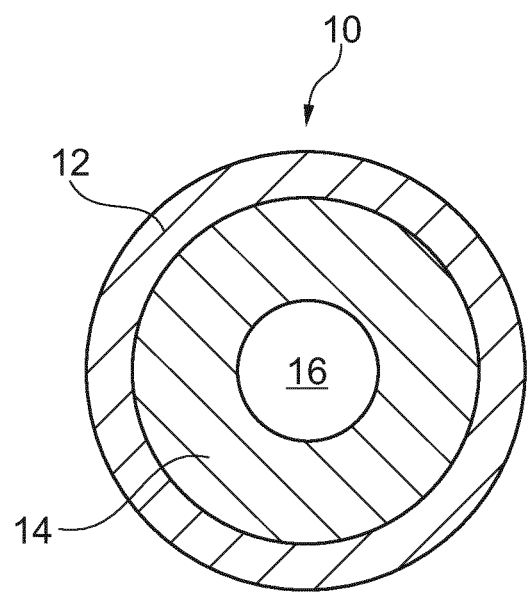
FIG. 4 schematically shows a cross section along the line IV-IV from FIG. 1 and FIG. 2, in which, for clarity, only one rotor shaft main body and one rotor shaft core are shown.

FIG. 3 shows a further embodiment of the rotor shaft 10. This differs from the embodiments mentioned above in that the rotor shaft 10 comprises an axially continuous air channel 30a and an axially continuous air channel 30b.

Here, the two air channels 30a, 30b run partially in the rotor shaft main body 12 and partially in the rotor shaft core 14 and are produced by drilling and/or erosion.

Here, the air channel 30a runs substantially parallel to a rotor shaft axis 32.

The air channel 30b encloses an acute angle α with the rotor shaft axis 32.

Here, it is also conceivable for the rotor shaft 10 to comprise only a single air channel, which is then either of the type of the air channel 30a or of the type of the air channel 30b.

The rotor shaft 10 may also comprise multiple air channels.

Figure 5:
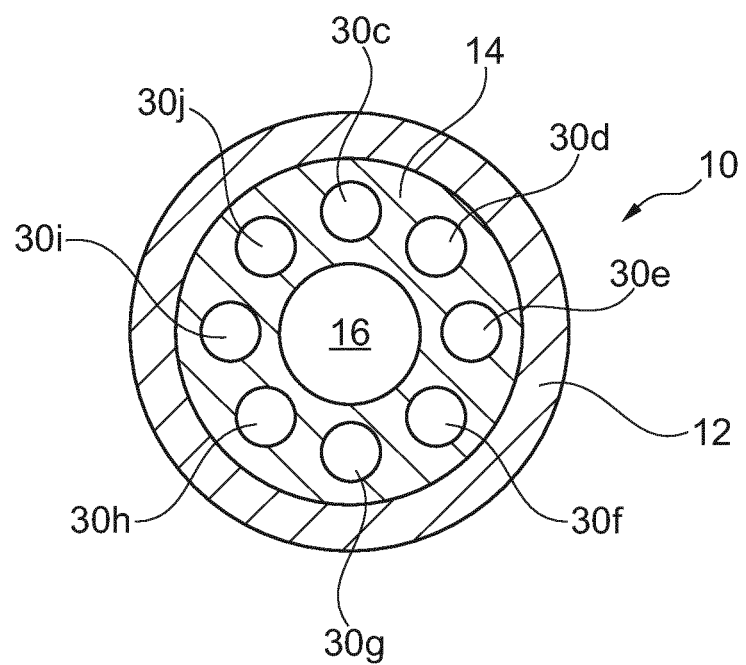
FIG. 5 schematically shows a cross section of a rotor shaft according to the invention of an electric machine according to the invention according to a second embodiment of the cross section.

In this regard, by way of example, FIG. 5 shows a cross section of a rotor shaft 10 which has eight air channels 30c to 30j. For the sake of clarity, neither the cooling fluid lance 18 nor the cooling fluid 20 are illustrated in this cross section.

The air channels 30c to 30j are arranged so as to be circumferentially uniformly distributed in the rotor shaft 10 and have each case an identical radial spacing to the cooling cavity 16.

If the rotor shaft 10 is set in rotational motion, air can flow through the air channels 30a to 30j. Air cooling of the rotor shaft 10 is thus realized. The air flow is symbolized by the arrows 34.

For the other features of the rotor shaft 10 according to the third embodiment, reference is made to the statements relating to FIGS. 1 and 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor shaft for an electric machine, the rotor shaft comprising:
   a rotor shaft main body; and
   a rotor shaft core which is arranged in the rotor shaft main body and which is connected to the rotor shaft main body along an entire length of the rotor shaft core,
   wherein the rotor shaft comprises a substantially axially running cooling cavity configured to conduct a cooling fluid,
   wherein the rotor shaft core is composed of a different material than the rotor shaft main body,
   wherein the rotor shaft comprises at least one axially continuous air channel that runs partially in the rotor shaft main body and partially in the rotor shaft core,
   wherein the rotor shaft comprises a plurality of air channels that are circumferentially uniformly distributed and arranged, in each case, with an identical radial spacing around the cooling cavity.

2. The rotor shaft according to claim 1, wherein a cooling fluid lance is arranged in the cooling cavity.

3. The rotor shaft according to claim 2, wherein a cooling fluid diverting piece is further arranged in the cooling cavity.

4. The rotor shaft according to claim 2, wherein the cooling cavity runs substantially centrally and in continuous fashion in the rotor shaft.

5. The rotor shaft according to claim 2, wherein the cooling cavity runs partially in the rotor shaft main body and partially in the rotor shaft core.

6. The rotor shaft according to claim 1, wherein the rotor shaft core is introduced as a solid body into the rotor shaft main body.

7. The rotor shaft according to claim 6, wherein the rotor shaft main body comprises two parts connected to one another after the introduction of the rotor shaft core.

8. The rotor shaft according to claim 1, wherein the rotor shaft core is produced from an aluminum material, a magnesium material and/or a plastic, and the rotor shaft main body is produced from a steel material.

9. The rotor shaft according to claim 1, wherein the cooling cavity runs substantially centrally and in continuous fashion in the rotor shaft.

10. The rotor shaft according to claim 1, wherein the cooling cavity runs partially in the rotor shaft main body and partially in the rotor shaft core.

11. The rotor shaft according to claim 1, wherein the rotor shaft core is spaced apart axially from a first and/or a second rotor shaft end.

12. The rotor shaft according to claim 1, wherein the rotor shaft core is introduced by a casting process into the rotor shaft main body.

13. The rotor shaft according to claim 1, wherein the axially continuous air channel is produced by drilling and/or erosion.

14. The rotor shaft according to claim 1, wherein the axially continuous air channel encloses an acute angle with a rotor shaft axis.

15. A rotor shaft for an electric machine, the rotor shaft comprising:
- a rotor shaft main body; and
- a rotor shaft core which is arranged therein and which is connected to the rotor shaft main body,
- wherein the rotor shaft comprises a substantially axially running cooling cavity configured to conduct a cooling fluid,
- wherein the rotor shaft core is composed of a different material than the rotor shaft main body,
- wherein the rotor shaft comprises at least one axially continuous air channel,
- wherein the rotor shaft comprises a plurality of air channels that are circumferentially uniformly distributed and arranged, in each case, with an identical radial spacing around the cooling cavity.

16. An electric machine having a rotor shaft, the rotor shaft comprising:
- a rotor shaft main body; and
- a rotor shaft core which is arranged in the rotor shaft main body and which is connected to the rotor shaft main body along an entire length of the rotor shaft core,
- wherein the rotor shaft comprises a substantially axially running cooling cavity configured to conduct a cooling fluid,
- wherein the rotor shaft core is composed of a different material than the rotor shaft main body,
- wherein the rotor shaft comprises at least one axially continuous air channel,
- wherein the rotor shaft comprises a plurality of air channels that are circumferentially uniformly distributed and arranged, in each case, with an identical radial spacing around the cooling cavity.

* * * * *